(12) United States Patent
Büker et al.

(10) Patent No.: US 11,807,294 B2
(45) Date of Patent: Nov. 7, 2023

(54) ENERGY ABSORPTION DEVICE, STEERING DEVICE WITH AN ENERGY ABSORPTION DEVICE AND METHOD FOR PRODUCING SAME

(71) Applicant: ZF Automotive Germany GmbH, Alfdorf (DE)

(72) Inventors: Richard Büker, Willich (DE); Stephan Haenisch, Dortmund (DE)

(73) Assignee: ZF Automotive Germany GmbH, Alfdorf (DE)

( * ) Notice: Subject to any disclaimer, the term of this patent is extended or adjusted under 35 U.S.C. 154(b) by 17 days.

(21) Appl. No.: 17/355,848

(22) Filed: Jun. 23, 2021

(65) Prior Publication Data
US 2022/0017138 A1 Jan. 20, 2022

(30) Foreign Application Priority Data

Jul. 20, 2020 (DE) .......................... 102020209038.6

(51) Int. Cl.
*B62D 1/19* (2006.01)
*F16F 7/12* (2006.01)

(52) U.S. Cl.
CPC .............. *B62D 1/195* (2013.01); *F16F 7/123* (2013.01); *F16F 7/128* (2013.01); *F16F 2224/0208* (2013.01); *F16F 2226/04* (2013.01); *F16F 2230/0052* (2013.01); *F16F 2234/00* (2013.01)

(58) Field of Classification Search
CPC .......... B62D 1/19; B62D 1/192; B62D 1/195; F16F 7/12; F16F 7/123; F16F 7/125; F16F 7/128; F16F 2230/0052; F16F 2234/00
USPC ..................... 74/493, 492; 280/777; 188/371
See application file for complete search history.

(56) References Cited

U.S. PATENT DOCUMENTS

2016/0272235 A1* 9/2016 Takahashi .............. B62D 1/195
2020/0031382 A1* 1/2020 Strong ................... B62D 1/192

FOREIGN PATENT DOCUMENTS

EP           3268261 B1      11/2019

* cited by examiner

*Primary Examiner* — Keith J Frisby
(74) *Attorney, Agent, or Firm* — Kristin L. Murphy

(57) ABSTRACT

The disclosure relates to an energy absorption device for arrangement between a fastening device and a holder, wherein the holder is movable relative to the fastening device when a predetermined impact force is exceeded. The energy absorption device includes a deformable strand for absorbing energy, and a guide device for guiding the strand during the deformation. In order to be able to implement the assembly and/or the production more cost-effectively, the strand and the guide device are formed in one piece.

18 Claims, 12 Drawing Sheets

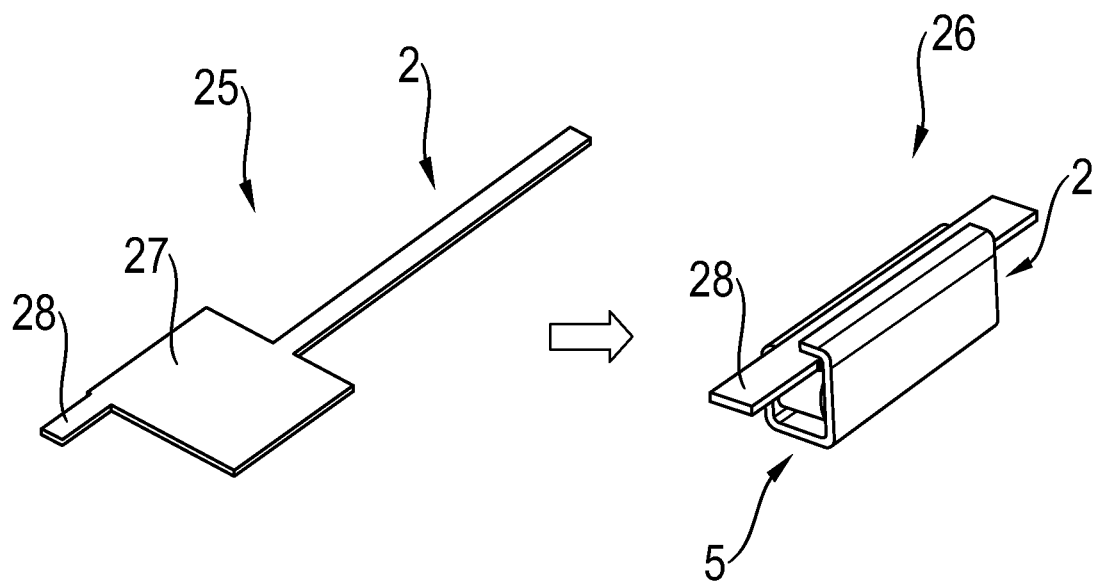

ENERGY ABSORPTION DEVICE, STEERING DEVICE WITH AN ENERGY ABSORPTION DEVICE AND METHOD FOR PRODUCING SAME

CROSS-REFERENCE TO RELATED APPLICATION

This application claims priority to German Patent Application No. 102020209038.6 filed Jul. 20, 2020, the disclosure of which is incorporated herein by reference in its entirety.

TECHNICAL FIELD

The disclosure relates to an energy absorption device for arrangement between a fastening device and a holder that is movable relative to the fastening device when a predetermined impact force is exceeded. The energy absorption device further includes a deformable strand for absorbing energy and a guide device for guiding the strand during a deformation operation. Furthermore, the disclosure relates to a steering device for a vehicle, with a fastening device for fastening to a vehicle carrier or a vehicle body, with a holder for holding a steering column, the holder having at least one connecting section for connecting to the fastening device, and with at least one energy absorption device. Finally, the disclosure also relates to a method for producing an energy absorption device and/or a steering device.

BACKGROUND

Energy absorption devices and/or steering devices are known from EP 3 268 261 B1. According to such known energy absorption devices, a guide device for guiding a strand during a deformation operation is designed as a component of a fastening device.

However, when the guide device is designed as a component of the fastening device and/or a holder, it is disadvantageous in that such an arrangement is associated with increased manufacturing and/or cost outlay. Simply omitting the guide device is also not desirable, since this results in the risk that the strand for absorbing energy will be deformed in a manner which is undesirable at least to some extent. As a result, the absorption properties of the energy absorption device can sometimes change uncontrollably during the deformation operation.

What is needed is further development of an energy absorption device, a steering device and/or a method of the type mentioned above in such a way that assembly and/or production can be implemented more cost-effectively.

SUMMARY

A controlled and/or predetermined deformation of a strand for absorbing energy of an introduced impact force should preferably be made possible by a guide device.

In one exemplary arrangement, an energy absorption device is designed for arrangement between a fastening device and a holder. In particular, the energy absorption device is designed for a steering device for a vehicle, in particular a motor vehicle. The holder can be moved relative to the fastening device when a predetermined impact force is exceeded. To absorb energy, in particular energy introduced by means of an impact force, the energy absorption device has a deformable strand. In one exemplary arrangement, the strand is formed from a steel or aluminum or other metal. It is also understood that the strand can be formed from a ductile material or an elastic material. The strand is guided by a guide device during the deformation to absorb the energy. According to an exemplary arrangement, the strand and the guide device are designed as one piece.

With the arrangement described above, the strand and the guide device are not designed as independent or separate components which first have to be connected to one another in a suitable manner during assembly. Instead, the strand and the guide device form a one-piece unit. This facilitates or simplifies assembly and leads to cost advantages in production.

In one exemplary arrangement, the energy absorption device is formed from a single semi-finished product and/or sheet metal element. Thus, both the strand and the guide device are made from the same semi-finished product and/or sheet metal element. In particular, the energy absorption device may be formed by stamping and/or reshaping, for example bending, or other suitable manufacturing processes. In one exemplary arrangement, the reshaping takes place after the stamping. Other suitable separating and/or cutting processes can be used as alternatives to stamping. In one exemplary arrangement, the strand and the guide device may be formed and/or shaped from sections of the semi-finished product and/or sheet metal element. In other words, the strand can thus be designed as a strand section of the energy absorption device. At the same time, the guide device is designed as a guide device section of the energy absorption device. Alternatively, the energy absorption device can be composed of several separate components.

According to one further exemplary arrangement, the strand is U-shaped or substantially U-shaped, in particular in relation to a side view. The strand accordingly has a first leg and a second leg. A curved section of the strand connects the first leg to the second leg, which results in the U-shaped design of the strand. In one exemplary arrangement, the curved section has a constant radius. In an initial position of the energy absorption device, the first leg may be shorter than the second leg. Alternatively, the first leg and the second leg can be of the same length in the initial position. In one exemplary arrangement, after a deformation of the strand in relation to the initial position due to an absorption of energy, the first leg is lengthened and the second leg is shortened. At least in one intermediate position during the deformation of the strand, the first leg and the second leg can be of the same length. In an end position after the deformation of the strand has ended, in particular after a maximum deformation of the strand, the first leg is longer than the second leg. The distance between the two legs preferably remains constant before, during and after the deformation due to the guide device. When the strand is deformed, the first leg and the second leg can be moved, in particular displaced or pulled, relative to one another.

According to a further exemplary arrangement, the guide device has a first guide section and a second guide section. In one exemplary arrangement, at least during the deformation of the strand, the first leg of the strand rests on the first guide section and the second leg of the strand rests on the second guide section. In an initial position, the first leg of the strand may already be in contact with the first guide section and the second leg of the strand may be in contact with the second guide section prior to the deformation of the strand. More specifically, the two guide sections are arranged on two sides of the strand facing away from one another. The U-shaped strand can thus be arranged between the two guide sections. In the event of a deformation due to absorption of energy, the strand may be unrolled in sections from the guide device and rolled up in sections onto the guide device. In one exemplary arrangement, one of the two legs is unrolled from one of the two guide sections during the deformation and at the same time the other leg is rolled up onto the other guide section. This exemplary arrangement that the first leg and the second leg are in contact with the guide device or the respective guide section continuously and during the entire deformation. More specifically, a suitable choice of the radius of the curved section of the U-shaped strand ensures the continuous contact. The guide device ensures a constant radius of the curved section of the U-shaped strand at least during the deformation of the strand.

According to a further exemplary arrangement, the radius of the curved section of the U-shaped strand can be smaller in an initial position than during and/or after the deformation. In such an instance, the first leg and/or the second leg of the strand in the initial position cannot rest against their individually assigned guide section or the first leg is spaced apart from the first guide section and/or the second leg is spaced apart from the second guide section. In particular, when the strand begins to deform, the radius is widened until the first leg rests against the first guide section and/or the second leg rests against the second guide section. The radius of the curved section thus remains constant in the event of a subsequent continued deformation.

In the initial position before the strand is deformed to absorb the energy, the strand can be connected at least partially and/or on one side, and in one exemplary arrangement, in the longitudinal direction of the relevant guide section, by bonding and/or in one piece, to the first guide section and/or to the second guide section. When the strand is deformed, this bonded connection between the strand and the first guide section and/or the second guide section is torn, in particular laterally, and/or sheared off. As a result, in addition to the deformation of the strand, a simultaneous partial material separation of the strand from the guide device is realized. If such a bonded connection is present, the energy absorption device can absorb the energy of a higher impact force and/or the guiding of the strand during its deformation can be improved.

According to a further exemplary arrangement, at least a first end of the strand merges in one piece with the guide device. In particular, the first end of a first leg of the strand merges in one piece into a first guide section of the guide device. The first end of the first leg can merge into the first guide section by means of a fold, in particular a fold of material. The result of the folding is preferably that the first leg and the first guide section rest against one another, in particular parallel to one another. A second end of the strand, in particular the second leg of the strand, preferably merges in one piece with the second guide section of the guide device. Here, the second end of the second leg can also merge into the second guide section by means of a fold, preferably a fold of material. Preferably, the result of the folding is that the second leg and the second guide section rest against one another, in particular parallel to one another.

At least one guide section of the guide device may be designed as a band section with a U-shaped or H-shaped cross section. In particular, a first guide section and a second guide section of the guide device are each designed as a band section with a U-shaped or H-shaped cross section. Such a cross section leads in a simple manner to sufficient stiffening of the respective guide section. This ensures that the strand is deformed in a controlled and/or predetermined manner when the energy is absorbed.

According to a further exemplary arrangement, the guide device is designed with a U-shaped or substantially U-like cross section. Correspondingly, a guide device designed in this way has a first leg flange and a second leg flange. In particular, a first leg flange of the guide device forms a first guide section and a second leg flange of the guide device forms a second guide section. In this exemplary arrangement, the two guide sections are connected to one another by a side section of the guide device. In other words, the guide device can be designed as a type of channel or tube that is open on one side. Lateral guiding of the strand may be implemented by the side section. Thus, the strand can be guided on two sides facing away from one another by the two guide sections and additionally at least on one side by the side section.

According to a further exemplary arrangement, the guide device is designed with a tubular and/or rectangular cross section. The guide device may have two walls which lie opposite one another and, between the two walls, two side walls which lie opposite one another. The strand is preferably arranged at least partially within the guide device. For example, a first wall of the guide device forms a first guide section and a second wall forms a second guide section. Here, the two guide sections are connected to one another by at least one of two side walls of the guide device. Lateral guiding of the strand is preferably implemented by at least one of the two side walls or by both side walls. Thus, the guiding or the deformation of the strand can be predetermined even more reliably by such a guide device.

Depending on the absorbing energy and/or the desired deformation behavior, the strand can have at least one material reduction, at least one material opening and/or at least one material thickening, in particular to influence an absorbing energy and/or a force profile. For example, several material reductions, material openings and/or material thickenings can be formed. A material opening can be implemented as a hole or as a slot.

A steering device for a vehicle, preferably a motor vehicle, with an energy absorption device according to one of the exemplary arrangements is particularly advantageous. In particular, the steering device has a steering wheel. The steering wheel of the steering device is connected to running wheels of the vehicle. In this case, the running wheels can be moved or aligned by the steering device and by turning the steering wheel. This enables a driver to control a direction of travel while the vehicle is in motion.

Due to the energy absorption device it is possible to better protect a driver of the vehicle from injuries in the event of an accident. In the event of an accident situation, in particular in the event of a frontal crash, the driver can be thrown onto the steering wheel and/or onto a triggered airbag of the steering wheel. As a result, the impact force can be introduced into the steering device and the energy absorption device via the steering wheel.

The steering device has a fastening device. The fastening device is designed for fastening to a vehicle carrier or a vehicle body of the vehicle. The vehicle carrier can be designed as a vehicle cross member. The fastening device may be fastened to the vehicle carrier or the vehicle body in the area of a dashboard or instrument panel. In particular, the fastening device is fastened to the vehicle carrier or the vehicle body in such a way that a relative movement between the fastening device and the vehicle carrier or the vehicle body is prevented.

Furthermore, the steering device has a holder for holding a steering column. In particular, the steering wheel is arranged on the steering column. The steering column can be adjustable in terms of inclination, height and/or length. This allows the position of the steering wheel to be adjusted to the height or ergonomics of the driver. The holder can have at least one connecting section for connecting to the fastening device by means of a fastening means. In particular, the holder is not fastened directly to the vehicle carrier or the vehicle body, but rather with the interposition of the fastening device. Here, the connection of the holder to the fastening device is secured and/or fixed by means of the fastening means. The fastening device may be designed as a screw, a bolt or a rivet.

The steering device can have at least one predetermined breaking section which is designed to break when a predetermined impact force is reached. The predetermined breaking section can be provided and/or formed by the energy absorption device. As an alternative or in addition, the predetermined breaking section can be designed as a device that is different and additional to the energy absorption device. In particular, the steering column and/or the holder is released from the fastening device after the breaking of the predetermined breaking section. In one exemplary arrangement, after the breaking of the predetermined breaking section, a predetermined pushing together of the steering device and/or the steering column, in particular in relation to the fastening device and/or away from the fastening device, is made possible. The steering device has at least one energy absorption device or several, and in one exemplary configuration, two, energy absorption devices. The energy absorption device has a deformable strand for absorbing energy and a guide device for guiding the strand during the deformation. Here, the strand and the guide device are formed in one piece.

According to a further exemplary arrangement, the guide device has a first guide section and a second guide section. Here, one of the two guide sections is firmly connected to the fastening device. The other guide section is firmly connected to the holder. Alternatively, the other guide section can only be assigned to the holder for joint displacement, in particular after the breaking of the predetermined breaking section. In the latter case, the other guide section does not have to be firmly connected to the holder, but it is sufficient that the other guide section makes contact with the holder in a suitable manner. The fastening of the relevant guide section and/or the assignment of the corresponding guide section can be implemented by means of a suitable bonded, frictional and/or interlocking connection to the fastening device and/or the holder. For example, one end of a leg of the strand can have a receptacle, an eye or an eyelet through which the fastening device for connecting the holder to the fastening device can be pushed.

Furthermore, a method for producing an energy absorption device according to exemplary arrangement and/or a steering device according to an exemplary arrangement is advantageous, wherein the energy absorption device is formed in one piece from a single semi-finished product and/or sheet metal element. The semi-finished product and/or sheet metal element can be produced from sheet metal by stamping or cutting, for example by a laser. Subsequently, a U-shaped or substantially U-shaped strand and the associated guide device, in particular with the first guide section and the second guide section, can be formed from this semi-finished product and/or sheet metal element by, in particular multiple, reshaping.

In particular, the energy absorption device and/or steering device produced according to the exemplary method disclosed above, is a previously described energy absorption device and/or steering device. The method may be performed in accordance with the designs explained in connection with the inventive energy absorption device and/or steering device described here. Furthermore, the energy absorption device and/or steering device described here can be further embodied in accordance with the designs explained in connection with the method.

BRIEF DESCRIPTION OF THE DRAWINGS

The disclosure is explained in more detail below with reference to the figures. Here, the same reference symbols relate to the same, similar or functionally identical components or elements, in which.

DETAILED DESCRIPTION

Figure 1:
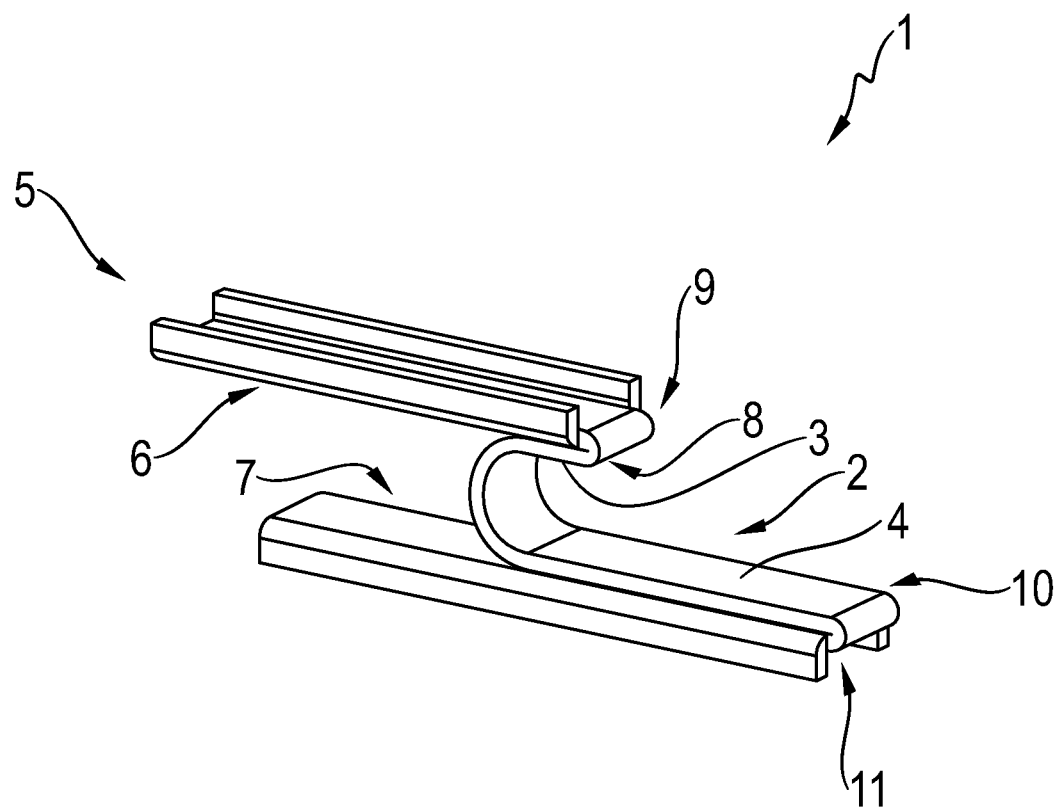
FIG. 1 is a perspective side view of an exemplary arrangement of a first energy absorption device according to the disclosure.

FIG. 1 shows a perspective side view of an exemplary arrangement of a first energy absorption device 1. The energy absorption device 1 has a deformable strand 2 for absorbing energy. The strand 2 is U-shaped or U-like. Here, the strand 2 has a first leg 3 and a second leg 4, which are aligned so as to be parallel to one another. In an initial position of the exemplary arrangement of the energy absorption device 1 shown here, the first leg 3 is shorter than the second leg 4.

Furthermore, the energy absorption device 1 also has a guide device 5. The guide device 5 is designed to guide the strand 2 during a deformation of the strand 2. In this embodiment, the guide device 5 has a first guide section 6 and a second guide section 7. The first guide section 6 is assigned to the first leg 3. The second guide section 7 is assigned to the second leg 4. In this case, the first leg 3 rests against the first guide section 6. The second leg 4 rests against the second guide section 7.

In this exemplary arrangement, the two guide sections 6, 7 are each designed as band sections with a U-shaped cross section. Furthermore, in this exemplary arrangement, the legs of these guide sections 6, 7, which are U-shaped in cross section, are each directed away from the strand 2. The two guide sections 6, 7 are aligned so as to be parallel to one another, wherein the U-shaped strand 2 is arranged between the two guide sections 6, 7.

In one exemplary arrangement, the strand 2 and the guide device 5 are formed in one piece. In this arrangement, a first end 8 of the strand 2, namely the first leg 3, merges in one piece into the guide device 5 or into the first guide section 6 due to a fold 9. Furthermore, in this arrangement, a second end 10 of the strand 2, namely the second leg 4, merges into the second guide section 7 due to a fold 11. Here, in this exemplary arrangement, the fold is designed as a 180° fold.

Figure 2:
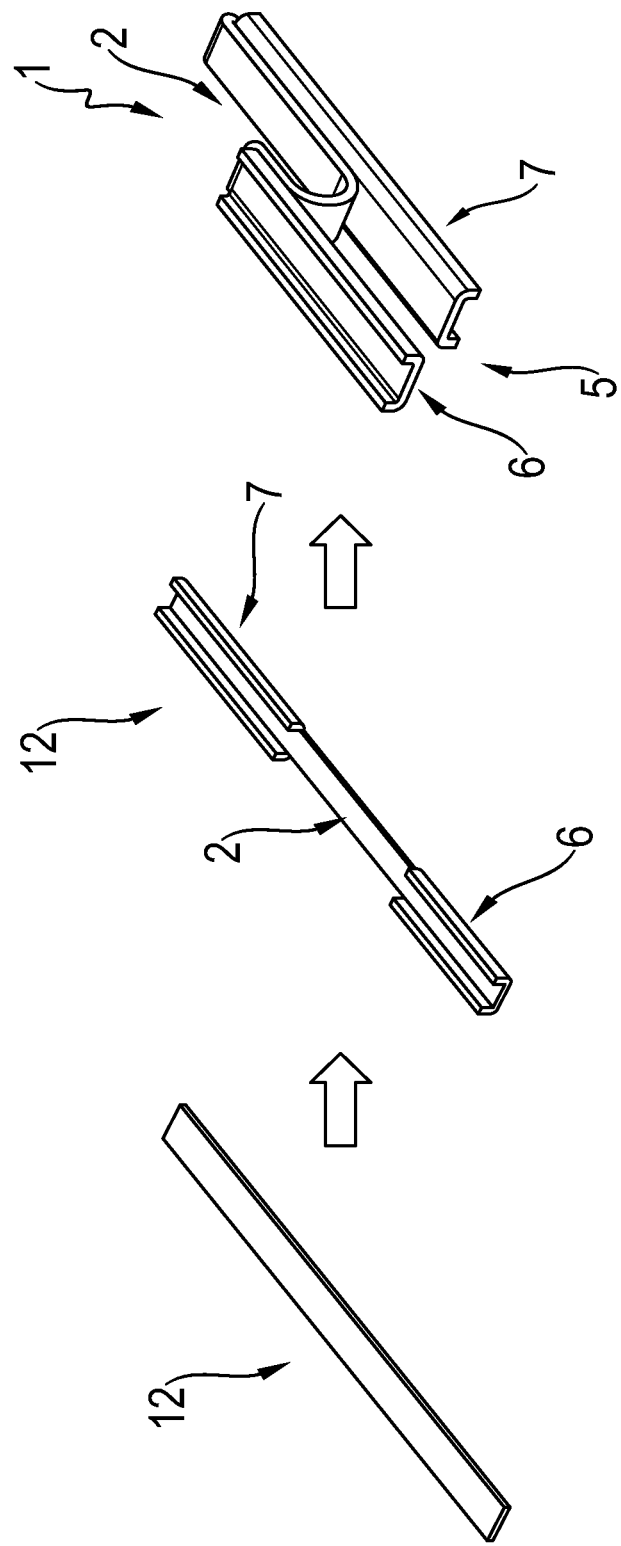
FIGS. 2a, 2b, and 2c are perspective side views of various intermediate stages for producing the first energy absorption device according to the exemplary arrangement of the disclosure according to FIG. 1, FIGS. 3a, 3b, and 3c are side views of the first energy absorption device according to the exemplary arrangement of the disclosure according to FIG. 1 in different states.

FIGS. 2a, 2b and 2c show perspective side views of various intermediate stages for producing the first energy absorption device 1 according to the exemplary arrangement according to FIG. 1.

FIG. 2a shows a semifinished product 12 which, in this embodiment, is designed as a sheet metal element or as a sheet metal strip. The semifinished product 12 is then processed by stamping and/or reshaping, FIG. 2b shows an intermediate stage in the processing of the semifinished product 12.

FIG. 2b already shows the guide sections 6 and 7 that have been formed. The strand 2, which is also already formed, extends between the two guide sections 6, 7. The strand 2 results from a stamping out in a central area of the semifinished product 2. The guide sections 6, 7 are formed by a subsequent reshaping of the corresponding edge regions, so that the U-shaped cross section of the guide section 6 and 7 is obtained. In the intermediate stage shown in FIG. 2b, the strand 2 is not yet U-shaped, but extends in a straight line between the two guide sections 6, 7.

Subsequently, the semifinished product 12 according to FIG. 2b is reshaped in such a way that, according to FIG. 2c, a final design of the energy absorption device 1 results. The U-shaped strand 2 and the guide device 5 are thus formed from sections of the semi-finished product 12.

Figure 3:
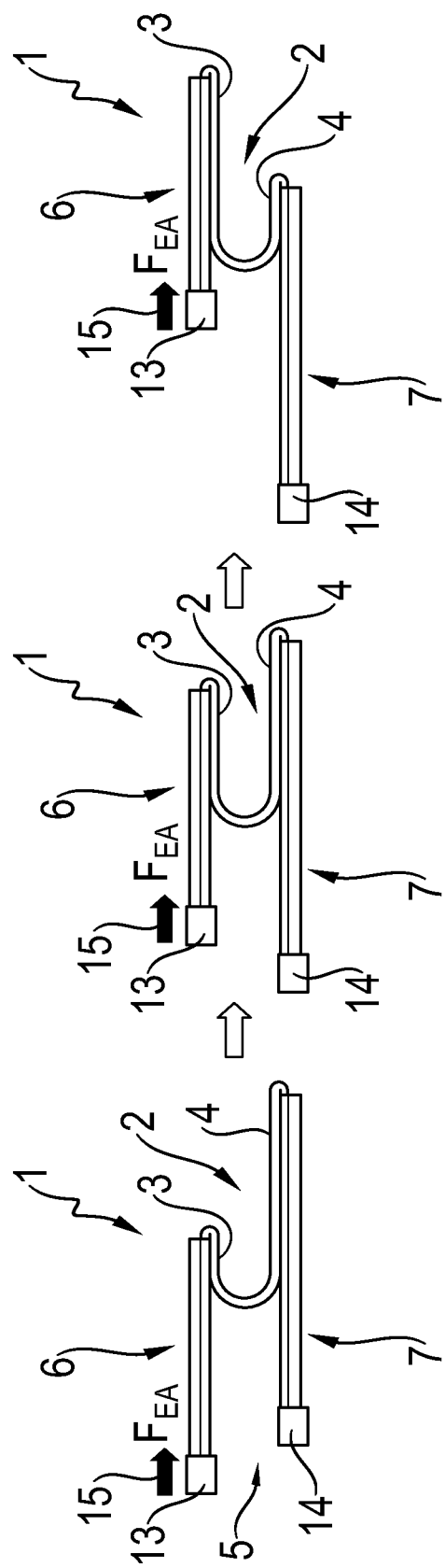

FIGS. 3a, 3b and 3c show side views of the first energy absorption device 1 according to the exemplary arrangement of the disclosure according to FIG. 1 in different states.

FIG. 3a shows the energy absorption device 1 in an initial position according to FIG. 1. In this initial position, the first leg 3 is shorter than the second leg 4. The first guide section 6 is connected to a fastening device 13 in a manner that is only indicated schematically here. The second guide section 7 is connected to a holder 14 in a manner that is also only indicated schematically here. When a predetermined impact force is exceeded, the holder 14 can be moved relative to the fastening device 13. Here, according to arrow 15, an impact force or an energy absorption force acts in the longitudinal direction of the first guide section 6 and in the direction of the first leg 3. The connections between the first guide section 6 and the fastening device 13 and between the second guide section 7 and the holder 14 are designed in such a way that they can absorb the forces and moments that occur when the strand 2 is deformed.

According to FIG. 3b, when the predetermined impact force is exceeded, there is a relative movement of the holder 14 in relation to the fastening direction 13 parallel to the longitudinal extension of the guide sections 6, 7. This leads to a deformation of the strand 2. In the course of a progressive deformation of the strand 2 or a continued relative movement or displacement of the holder 14 in relation to the fastening device 13, the first leg 3 is lengthened and the second leg 4 is shortened. In this embodiment, the deformation of the strand 2 in relation to the guide device 5 takes place with little or almost no friction.

FIG. 3c shows an end position of the energy absorption device 1 after a maximum deformation of the strand 2. In this end position, the first leg 3 is longer than the second leg 4. The two guide sections 6, 7 are displaced parallel to one another compared to the initial position according to FIG. 3a. Here, the distance between the two guide sections 6, 7 has remained unchanged.

Figure 4:
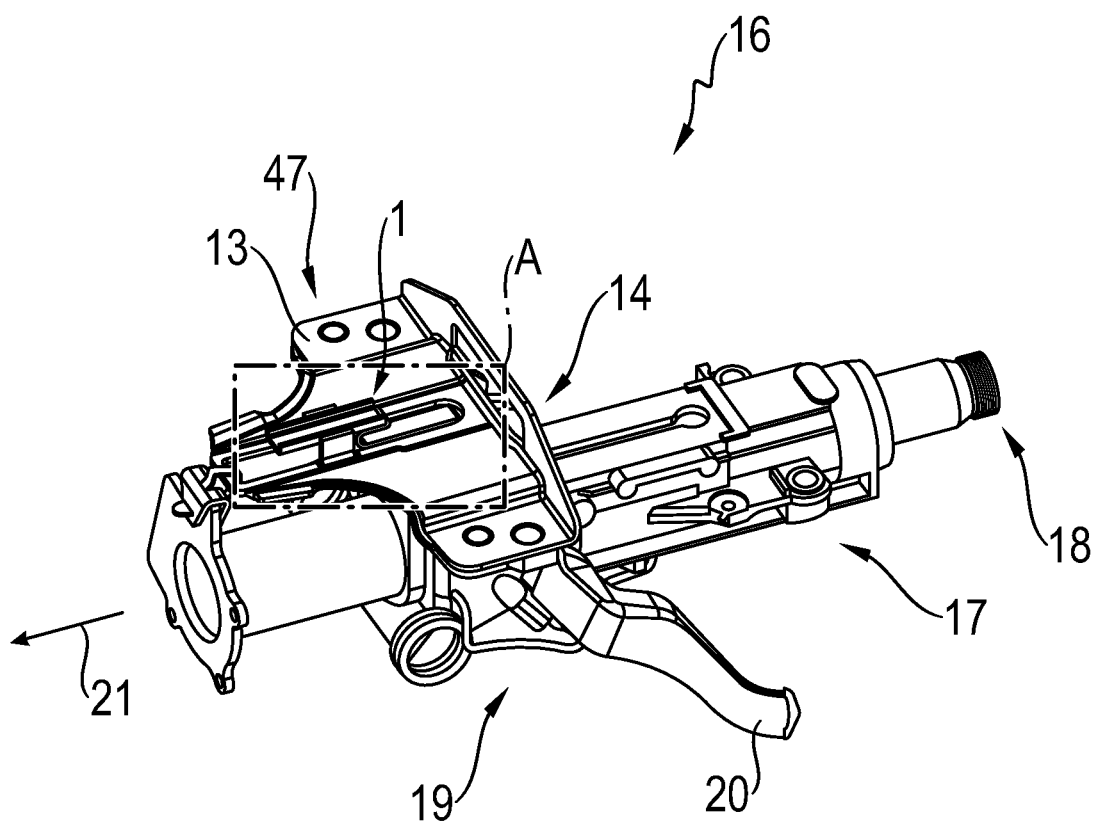
FIG. 4 is a perspective side view of an exemplary arrangement of a first steering device according to the disclosure with the first energy absorption device according to FIG. 1.

FIG. 4 shows a perspective side view of a first steering device 16 according to an exemplary arrangement of the disclosure with the first energy absorption device 1 according to FIG. 1. The steering device 16 can be arranged on a vehicle carrier not shown in detail here, for example a vehicle cross member. The steering device 16 has a fastening device 13. The steering device 16 is or can be fastened to a vehicle carrier (not shown in detail here) by the fastening device 13. The steering device 16 also has a holder 14. The holder 14 is connected to the fastening device 13 by a connecting device 47 not shown in detail here. Furthermore, the holder 14 holds a steering column 17 of the steering device 16. At a free end 18 of the steering column 17, a steering wheel, not shown here, can be or will be arranged.

In this exemplary arrangement, the steering device 16 has an adjusting mechanism 19. This adjusting mechanism 19 includes, inter alia, a lever 20. The steering column 17 and thus a steering wheel can be adjusted by the adjusting mechanism 19 with regard to its inclination and/or height. For this purpose, the steering column 17 can be adjusted in terms of its inclination, height and/or length by the adjusting mechanism 19. To adjust the inclination and/or height, the adjusting mechanism 19 is released by the lever 20. After the desired inclination and/or height has been set, the adjusting mechanism 19 is fixed or blocked by the lever 20.

The energy absorption device 1 is designed to absorb an impact force introduced via a steering wheel. For example, in an accident situation or as a result of a crash, a driver of a vehicle is thrown with the steering device 16 toward and onto the steering wheel or onto an airbag which is arranged on the steering wheel and triggered, and is not shown here. As a result, the impact force is introduced into the steering device 16 via the steering wheel at the free end 18 of the steering column 17. When a predetermined impact force is reached, the holder 14 is released from the fastening device 13. Thus, from the predetermined impact force, a yielding or displacement of the steering column 17 in a pull-out direction according to the arrow 21 is possible. In this embodiment, the pull-out direction according to arrow 21 is oriented essentially parallel to the longitudinal extension of the steering column 17. Furthermore, in this embodiment, the pull-out direction is directed according to arrow 21 starting from the free end 18 in the direction of the fastening device 13.

Figure 5:
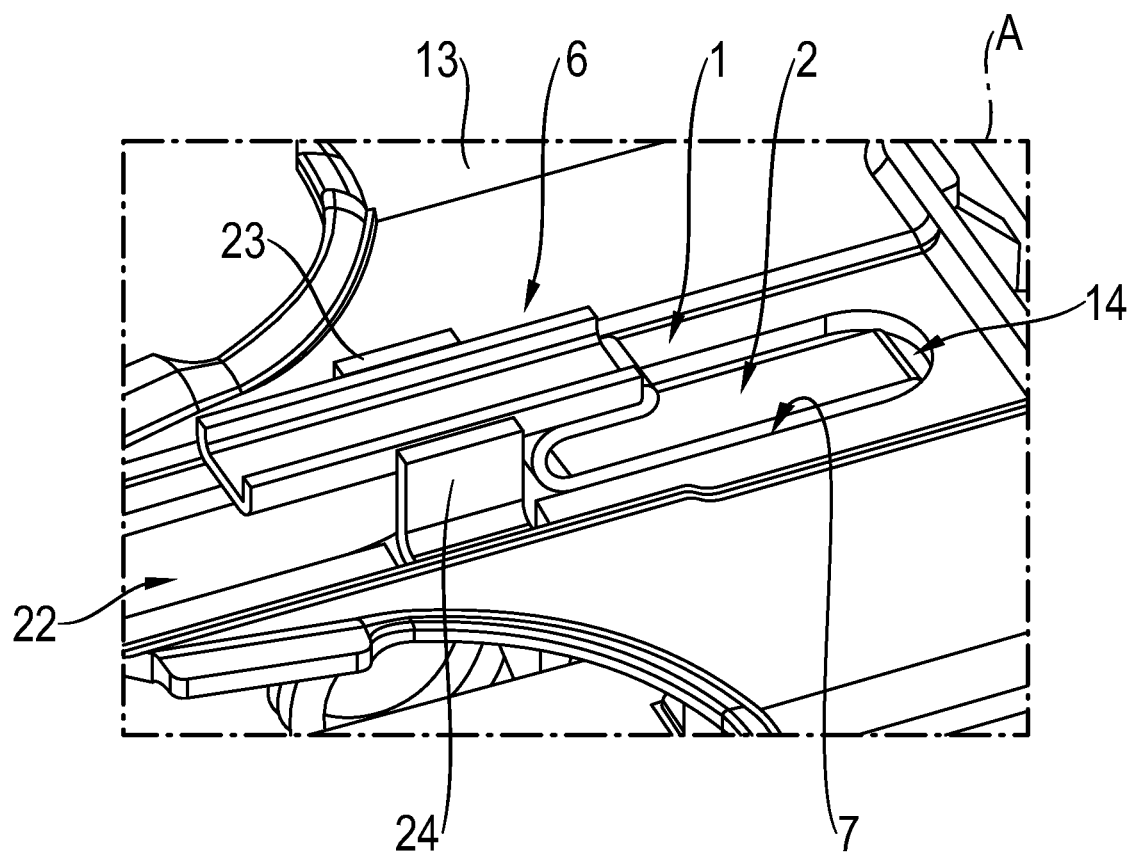
FIG. 5 is an enlarged detail of a steering device according to an exemplary arrangement of the disclosure according to FIG. 4, FIGS. 6a, and 6b are perspective side views respectively of a semi-finished product for forming an exemplary second energy absorption device according to the disclosure and of the formed second energy absorption device.

FIG. 5 shows a detail A of the steering device 16 according to an exemplary arrangement of the disclosure according to FIG. 4. In this exemplary arrangement, the fastening device 13 has a slot 22 for arrangement of the energy absorption device 1. In the region of the slot 22, the fastening device 13 has two opposing flanges 23, 24 on two sides of the slot 22. The first guide section 6 is arranged between the flanges 23, 24 and firmly connected to them. The second guide section 7, on the other hand, is firmly connected to the holder 14. When a predetermined impact force is reached, the holder 14 is released from the fastening device 13. During the subsequent deformation of the strand 2, the second guide section 7 moves in the direction of and parallel to the first guide section 6. Due to the continuously occurring deformation of the strand 2, energy is continuously absorbed.

FIG. 6a shows a perspective side view of a semifinished product 25 for forming a second energy absorption device 26 according to an exemplary arrangement of the disclosure according to FIG. 6b. FIG. 6a shows the semifinished product 25, which in this exemplary arrangement is designed as a sheet metal element or metal sheet. The contour or the shape of the outer edge of the semifinished product 25 has been produced in this arrangement by stamping. In the semifinished product 25 according to FIG. 6a, the strand 2 is not yet U-shaped, but rather extends linearly or in a straight line. One end of the strand 2 merges into a substantially rectangular plate 27. On a side of the plate 27 facing away from the strand 2, a flange piece 28 projects from the plate 27. Starting from the semi-finished product 25 according to FIG. 6a, this product is reshaped in a suitable manner, so that the desired energy absorption device 26 results according to FIG. 6b. The energy absorption device 26 is constructed in one piece and has the U-shaped strand 2 and a guide device 5.

Figure 7A:
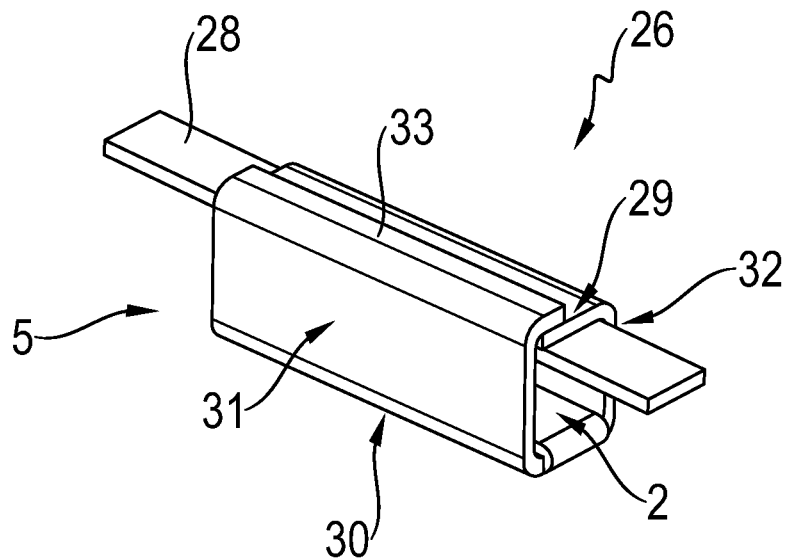
FIGS. 7a and 7b are further, partially transparent, perspective side views of the second energy absorption device according an exemplary arrangement of the disclosure according to FIG. 6b, FIGS. 8a and 8b are perspective side views respectively of a semi-finished product for forming an exemplary third energy absorption device according to the disclosure and of the formed third energy absorption device.
Figure 7B:
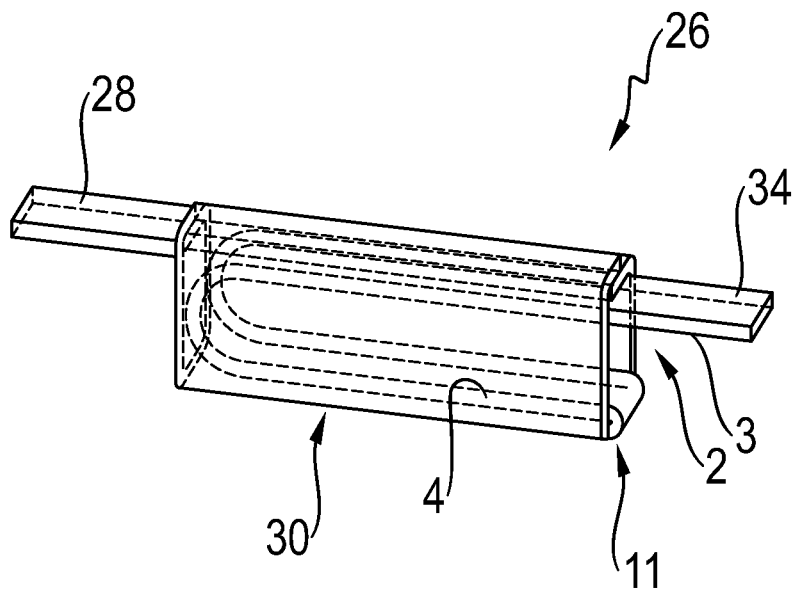

FIGS. 7a and 7b show further perspective side views of the second energy absorption device 26 according to the exemplary arrangement according to FIG. 6b. In this arrangement, the guide device 5 is designed with a tubular or rectangular cross section. The guide device 5 of the energy absorption device 26 has a first wall 29 and a second wall 30. Furthermore, in this arrangement, the guide device 5 has two side walls 31, 32. The first wall 29 forms a first guide section 29 for the strand 2. The second wall 30 forms a second guide section 30 for the strand 2. In addition, in this embodiment two side walls 31, 32 form a lateral guide for the strand 2. The first wall 29 is connected to the second wall 30 by the side wall 32. The second wall 30 is connected to the side wall 31, wherein the two side walls 31, 32 lie opposite one another and the strand 2 is arranged between them. An edge 33 is formed onto the first wall 29 on a side of the side wall 31 facing away from the second wall 30. In this case, the edge 33 rests against the first wall 29 on a side facing away from the strand 2.

FIG. 7b shows a transparent perspective side view of the energy absorption device 26. In this arrangement, a first leg 3 of the strand 2 is formed with a free leg end 34. The leg end 34 can be firmly connected to a fastening device or holder, not shown in greater detail here. The second leg 4 of the strand 2 merges in one piece with the second wall 30 by a fold 11. On a side facing away from the leg end 34, the flange piece 28 extends outward. The flange piece 28 can be used for fastening to the fastening device or holder that is not connected to the leg end 34.

In this exemplary arrangement, the deformation of the strand 2 in relation to the guide device 5 and, in contrast to the arrangement according to FIG. 3a to 3c, is subject to friction. In contrast to the arrangement according to FIG. 3a to 3c, additional forces and/or moments can be absorbed by the additional walls 29, 30.

Figures 8A, 8B:
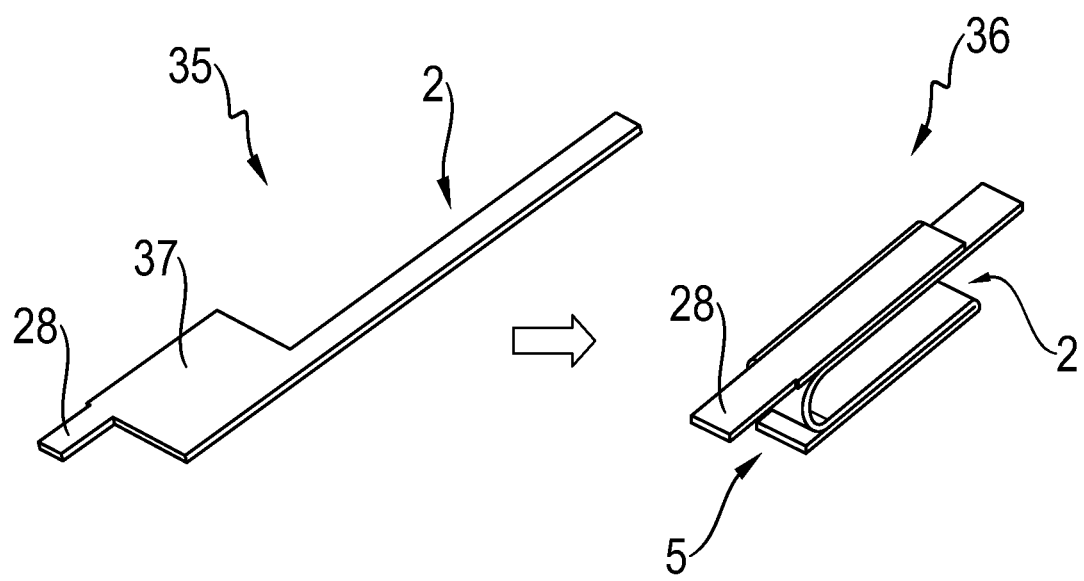

FIG. 8a shows a perspective side view of a semifinished product 35 for forming a third energy absorption device 36 according to an exemplary arrangement of the disclosure according to FIG. 8b. The semifinished product 35 is designed in a similar manner to the semifinished product 25 according to FIG. 6a. However, whereas according to FIG. 6a the strand 2, which still extends in a straight line, merges into the plate 27 in a central region, in the semifinished product 35 according to FIG. 8a the strand 2, which still extends in a straight line, merges into the plate 37 in an edge region. As a result, the strand 2 and the plate 37 form a common straight edge. After a suitable reshaping of the semifinished product 35, the energy absorption device 36 is produced according to FIG. 8b. This has the U-shaped strand 2 and a guide device 5.

Figure 9A:
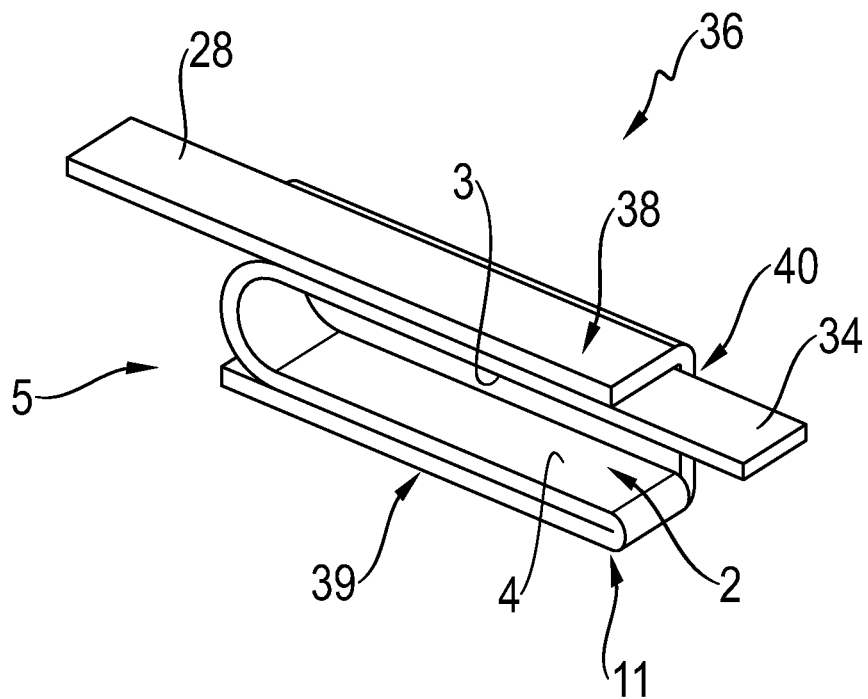
FIGS. 9a and 9b are further perspective side views of the exemplary arrangement of the third energy absorption device according to the disclosure according to FIG. 8b.
Figure 9B:
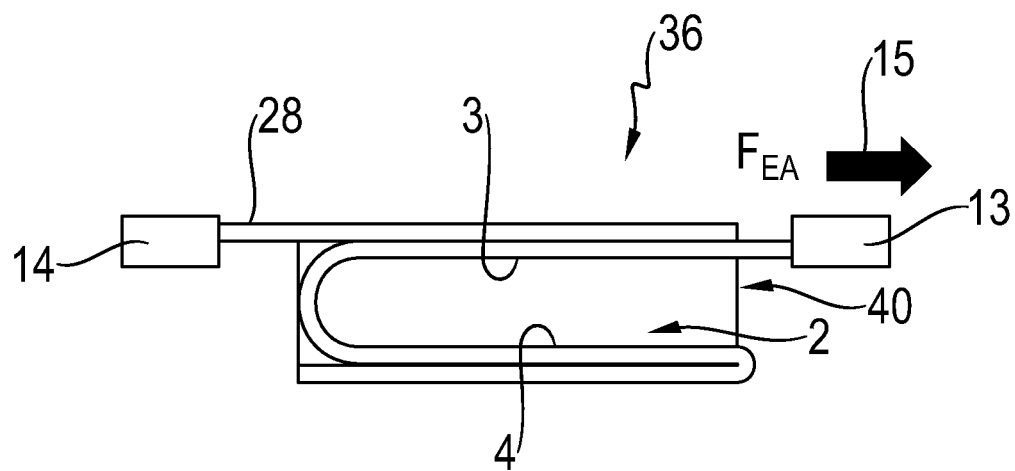

FIGS. 9a and 9b show perspective side views of the third energy absorption device 36 according to the disclosure according to FIG. 8b. In this exemplary arrangement, the guide device 5 of the energy absorption device 36 is designed with a U-shaped cross section. Correspondingly, in this arrangement, the guide device 5 has a first leg flange 38 and a second leg flange 39. In this case, the first leg flange 38 at the same time forms a first guide section 38 and the second leg flange 39 forms a second guide section 39 of the guide device 5. These two guide sections or the two leg flanges 38, 39 are connected to one another by a side section 40 of the guide device 5. In this case, lateral guiding of the strand 2 is realized at the same time by the side section 40. As in the case of the energy absorption device 26 according to FIG. 7b, the strand 2 according to the energy absorption device 36 is also formed with a free leg end 34 on the first leg 3. The second leg 4 merges in one piece with the second leg flange 39 by a fold 11.

FIG. 9b shows the energy absorption device 36 in which the flange piece 28 is connected to a holder 14, which is only indicated schematically here, and the free leg end 34 is connected to a fastening device 13 which is only indicated schematically here.

When a predetermined impact force is reached, a relative movement occurs between the holder 14 and the fastening device 13, wherein the fastening device 13 and the holder 14 move away from one another according to the arrow 15. This leads to a deformation of the strand 2. In the course of a progressive deformation and starting from the initial position shown here, the first leg 3 is lengthened and the second leg 4 is continuously shortened until an end position, not shown here, is reached.

In this arrangement, the deformation of the strand 2 in relation to the guide device 5 and, in contrast to the arrangement according to FIGS. 3a to 3c, is subject to friction. In contrast to the arrangement according to FIG. 3a to 3c, additional forces and/or moments can be absorbed by the additional side section 40.

Figure 10:
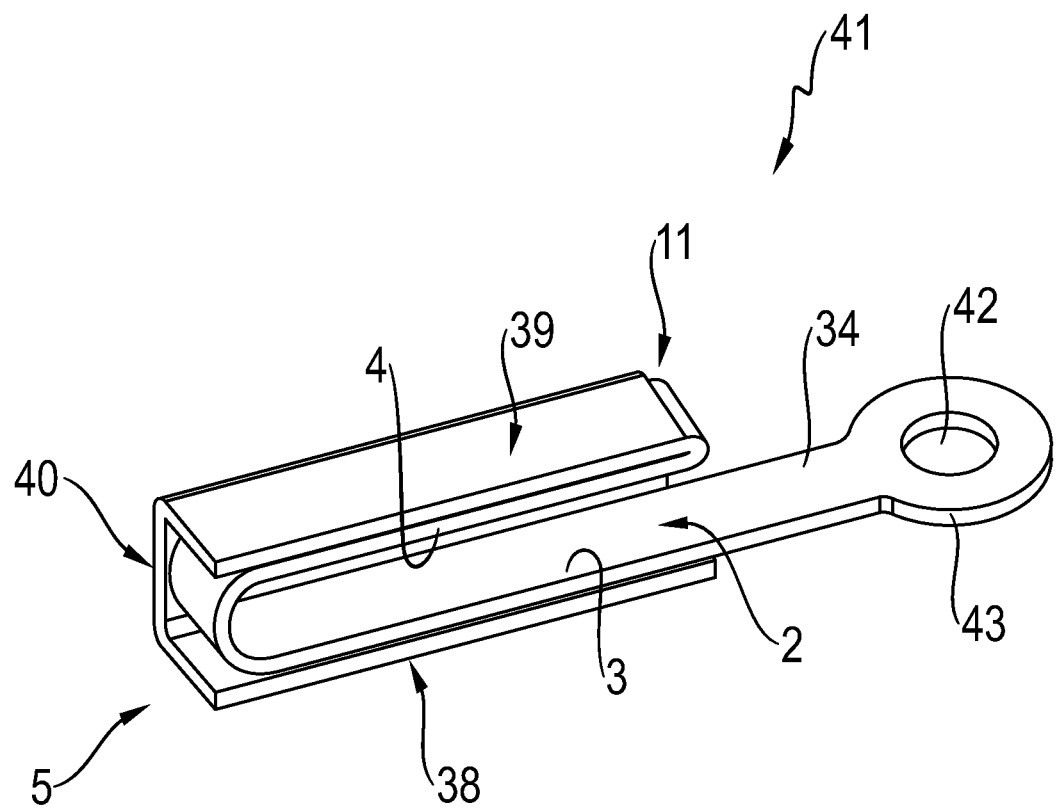
FIG. 10 is a perspective side view of a further exemplary arrangement of an energy absorption device according to the disclosure.

FIG. 10 shows a perspective side view of a further energy absorption device 41 according to an exemplary arrangement of the disclosure. The structure and the mode of operation of the energy absorption device 41 largely corresponds to the energy absorption device 36 according to FIGS. 8b to 9b. In this respect, reference is also made to the preceding description in order to avoid repetition. In a departure from this, the free leg end 34 of the energy absorption device 41 additionally has a through-opening 42. In this arrangement, the through-opening 42 is formed by an annular section 43 merging in one piece into the leg end 34.

Figure 11:
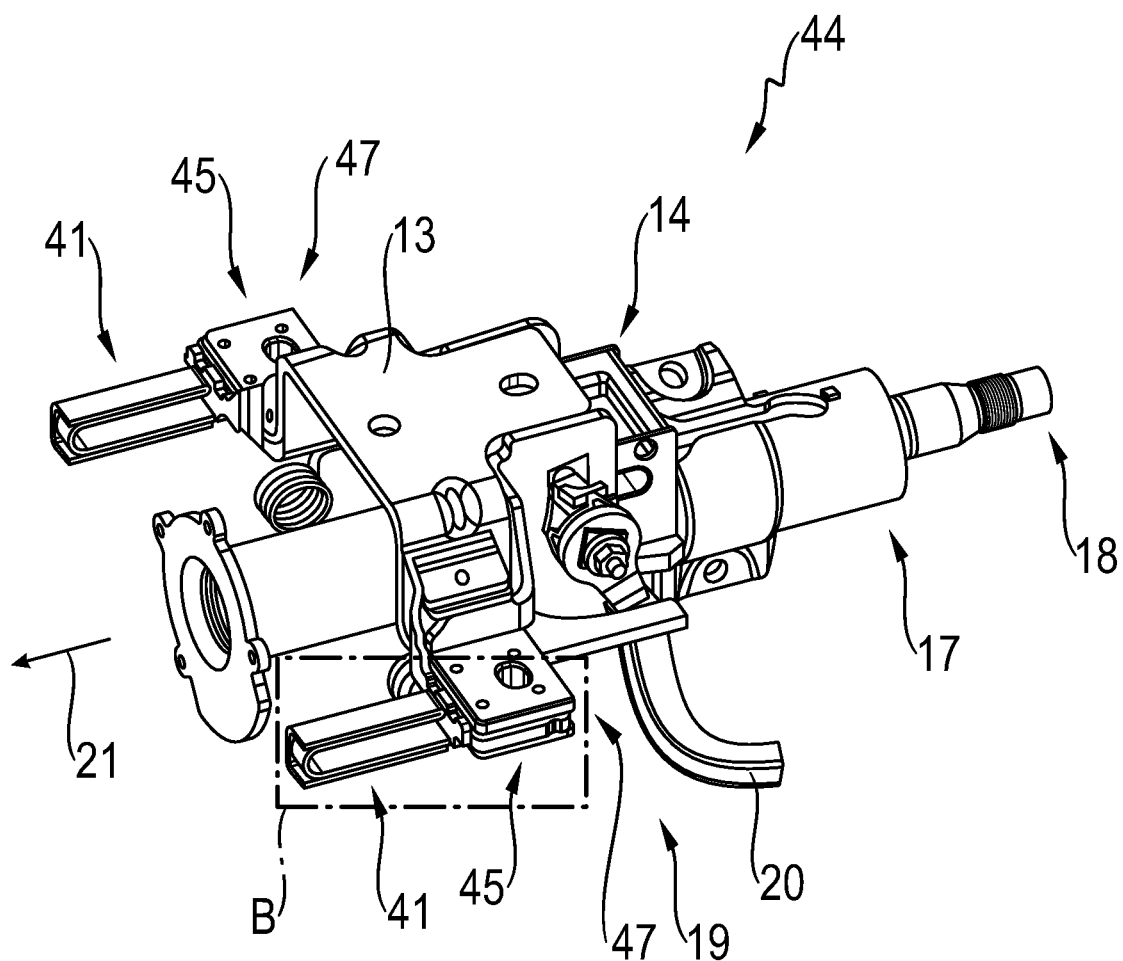
FIG. 11 is a perspective side view of a further exemplary arrangement of a steering device according to the disclosure with the further energy absorption device according to FIG. 10.

FIG. 11 shows a perspective side view of a further steering device 44 according to the exemplary arrangement of the disclosure with the further energy absorption device 41 according to FIG. 10. In terms of structure and mode of operation, the steering device 44 largely corresponds to the steering device 16 according to FIG. 4. In this respect, reference is also made to the preceding description in order to avoid repetition.

In this exemplary arrangement, the fastening device 13 and the holder 14 are connected to one another by two connecting devices 47. These connecting devices 47 each have a predetermined breaking device 45.

Figure 12:
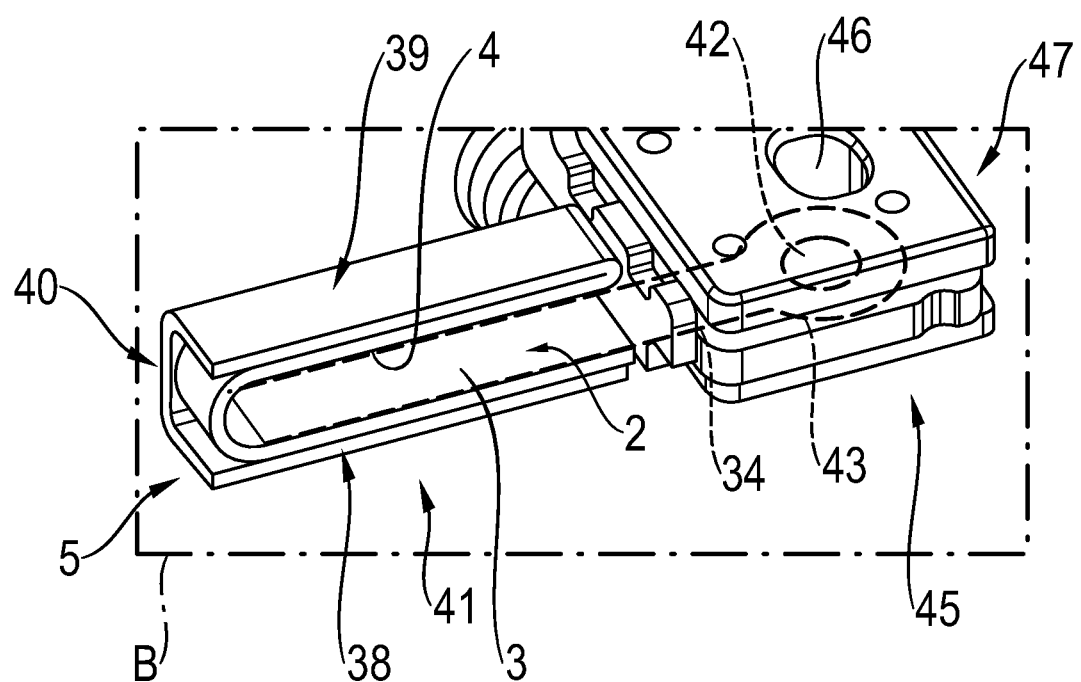
FIG. 12 is a partially transparent detail of the exemplary arrangement of the steering device according to the disclosure according to FIG. 11.

The following FIG. 12 shows the detail B of the steering device 44.

FIG. 12 shows a partially transparent detail B of the steering device 44 according to the exemplary arrangement of the disclosure according to FIG. 11. The predetermined breaking device 45 has a through-hole 46. The through-hole 46 and the through-opening 42 of the energy absorption device 41 are designed or aligned to correspond to one another, so that a fastening device (not shown here), for example a screw, can be inserted through the through-hole 46 and through the through-opening 42. In this way, the leg end 34 of the strand 2 can be connected to the fastening device 13 in a simple and effective manner.

What is claimed is:

1. An energy absorption device for arrangement between a fastening device and a holder, wherein the holder is movable relative to the fastening device when a predetermined impact force is exceeded, with a deformable strand for absorbing energy, and with a guide device for guiding the strand during a deformation, wherein the strand and the guide device are designed as a one piece element and wherein the strand is U-shaped with a first leg and a second leg, wherein the first leg is shorter than the second leg in an initial position, and after a deformation of the strand in relation to the initial position due to an absorption of energy, the first leg being lengthened and the second leg being shortened; and wherein the guide device has a first guide section and a second guide section, wherein at least during the deformation of the strand the first leg of the strand rests against the first guide section and the second leg of the strand rests against the second guide section.

2. The energy absorption device according to claim 1, wherein the energy absorption device is formed from a single semi-finished product and/or sheet metal element, and the strand and the guide device are formed from sections of the semi-finished product and/or sheet metal element.

3. The energy absorption device according to claim 1, wherein a first end of the first leg of the strand merges in one piece into the first guide section of the guide device by a fold.

4. The energy absorption device of claim 3, wherein a second end of the strand merges into the second guide section of the guide device by a second fold.

5. The energy absorption device according to claim 1, wherein at least one guide section of the guide device is designed as a U-shaped belt section.

6. The energy absorption device of claim 5, wherein the first guide section and the second guide section of the guide device are each designed as a band section with a U-shaped cross section.

7. The energy absorption device according to claim 1, wherein the guide device is designed with a U-shaped cross section, wherein a first leg flange of the guide device forms the first guide section and a second leg flange of the guide device forms the second guide section, wherein the two guide sections are connected to one another by a side section of the guide device, and lateral guiding of the strand is implemented by the side section.

8. The energy absorption device according to claim 1, wherein the guide device is designed with a tubular and/or rectangular cross section, and wherein a first wall of the guide device forms the first guide section and a second wall of the guide device forms the second guide section, wherein the first and second guide sections are connected to one another by at least one of two side walls of the guide device, and lateral guiding of the strand is implemented by at least one of the two side walls.

9. The energy absorption device of claim 8, wherein lateral guiding of the strand is implemented by both side walls.

10. A steering device for a vehicle and with a fastening device for fastening to a vehicle carrier or a vehicle body, with a holder for holding a steering column, the holder having at least one connecting section for connection to the fastening device, and with at least one energy absorption device according to claim 1.

11. The steering device according to claim 10, wherein one of the first and second guide sections is firmly connected to the fastening device and the respective other guide section is firmly connected to the holder for mutual displacement after breaking of a predetermined breaking section.

12. The steering device according to claim 10, wherein the fastening device has a slot for receiving the energy absorption device.

13. The steering device according to claim 12, wherein the fastening device has two opposing flanges disposed on opposing sides of the slot and wherein the first guide section is arranged between the opposing flanges.

14. The steering device according to claim 12, wherein the second guide section is connected to the holder and wherein when a predetermined impact force is reached, the holder is released from the fastening device.

15. A method for producing an energy absorption device according to claim 1, wherein the energy absorption device is formed in one piece from a single semi-finished product and/or sheet metal element.

16. The method for producing an energy absorption device of claim 15, wherein the single semi-finished product and/or sheet metal element is processed to an intermediate stage wherein the first and second guide sections are formed with upwardly extending flanges with the strand extending in a straight line between the first and second guide sections.

17. The method for producing an energy absorption device of claim 16, wherein the first and second guide sections are displaced from each other so as to space the first and second guide sections apart from one another, and the strand is disposed in a U-shape between the first and second guide sections.

18. The energy absorption device of claim 1, wherein the first guide section and the second guide section are spaced apart from one another, but arranged to be parallel to one another.

* * * * *